(12) United States Patent
Eicher

(10) Patent No.: US 12,093,227 B2
(45) Date of Patent: Sep. 17, 2024

(54) CAPSULE MIGRATION

(71) Applicant: International Business Machines Corporation, Armonk, NY (US)

(72) Inventor: Brent Philip Eicher, Mooresville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/060,760

(22) Filed: Dec. 1, 2022

(65) Prior Publication Data

US 2024/0184755 A1    Jun. 6, 2024

(51) Int. Cl.
G06F 16/21    (2019.01)
G06F 16/26    (2019.01)

(52) U.S. Cl.
CPC ............ G06F 16/214 (2019.01); G06F 16/26 (2019.01)

(58) Field of Classification Search
CPC ........... G06F 2009/4557; G06F 9/4856; G06F 3/0647; G06F 9/5083; G06N 20/00
See application file for complete search history.

(56) References Cited

U.S. PATENT DOCUMENTS

| | | | |
|---|---|---|---|
| 8,117,613 B2 | 2/2012 | Uyeda | |
| 8,245,140 B2 | 8/2012 | Barber | |
| 8,566,825 B2 | 10/2013 | Bozek | |
| 8,589,555 B2 | 11/2013 | Chen | |
| 8,601,471 B2 | 12/2013 | Beaty | |
| 8,667,019 B2 | 3/2014 | Mehra | |
| 8,667,020 B2 | 3/2014 | Zhaofu | |
| 8,850,423 B2 | 9/2014 | Barkie | |
| 9,223,636 B2 | 12/2015 | Osogami | |
| 9,329,888 B2 | 5/2016 | Dow | |
| 9,766,945 B2 | 9/2017 | Gaurav | |
| 10,048,976 B2 | 8/2018 | Ansari | |
| 10,776,244 B2 | 9/2020 | Davis | |
| 10,789,106 B2 | 9/2020 | Cardosa | |
| 11,182,718 B2 | 11/2021 | Palavalli | |
| 2011/0161851 A1* | 6/2011 | Barber | G06F 9/5077 718/1 |
| 2017/0147405 A1* | 5/2017 | Birkestrand | G06F 9/4856 |
| 2019/0250946 A1 | 8/2019 | Parameshwaran | |

* cited by examiner

*Primary Examiner* — Hau H Hoang
(74) *Attorney, Agent, or Firm* — Edward J. Wixted, III

(57) ABSTRACT

Embodiments of the present invention provide computer-implemented methods, computer program products and computer systems. For example, embodiments of the present invention can, in response to receiving a request, analyze one or more components of a network. Embodiments of the present invention can predict an optimal migration path for the one or more components of the network based, at least in part on an opportunity rating for each respective component of the network. Embodiments of the present invention can then generate one or more recommendations based on the predicted optimal migration path of the one or more components.

20 Claims, 11 Drawing Sheets

400

| HOST NAME | HARDWARE CLASS | AVAILABILITY ZONE | CAPSULE COUNT | TOTAL GB | USED GB | OPPORTUNITY RATING |
|---|---|---|---|---|---|---|
| HOST 1 | DATA | ZONE 1 | 25 | 100 | 6 | 4 |
| HOST 2 | DATA | ZONE 2 | 50 | 100 | 12 | 2 |
| HOST 3 | DATA | ZONE 3 | 75 | 100 | 18 | 1.33 |
| HOST 4 | DATA | ZONE 1 | 100 | 100 | 24 | 1 |
| HOST 5 | DATA | ZONE 2 | 125 | 100 | 31 | 0.8 |
| HOST 6 | DATA | ZONE 3 | 150 | 100 | 37 | 0.67 |
| HOST 7 | DATA | ZONE 1 | 175 | 100 | 43 | 0.57 |
| HOST 8 | DATA | ZONE 2 | 200 | 100 | 49 | 0.5 |
| HOST 9 | DATA | ZONE 3 | 225 | 100 | 55 | 0.44 |

FIG. 4A

| HOST NAME | HARDWARE CLASS | AVAILABILITY ZONE | CAPSULE COUNT | TOTAL GB | USED GB | OPPORTUNITY RATING |
|---|---|---|---|---|---|---|
| HOST 2 | DATA | ZONE 2 | 50 | 100 | 12 | 2 |
| HOST 3 | DATA | ZONE 3 | 75 | 100 | 18 | 1.33 |
| HOST 4 | DATA | ZONE 1 | 100 | 100 | 24 | 1 |
| HOST 5 | DATA | ZONE 2 | 125 | 100 | 31 | 0.8 |
| HOST 6 | DATA | ZONE 3 | 150 | 100 | 37 | 0.67 |
| HOST 7 | DATA | ZONE 1 | 200 | 100 | 49 | 0.57 |
| HOST 8 | DATA | ZONE 2 | 200 | 100 | 49 | 0.5 |
| HOST 9 | DATA | ZONE 3 | 225 | 100 | 55 | 0.44 |

FIG. 4B

| HOST NAME | HARDWARE CLASS | AVAILABILITY ZONE | CAPSULE COUNT | TOTAL GB | USED GB | OPPORTUNITY RATING |
|---|---|---|---|---|---|---|
| HOST 3 | DATA | ZONE 3 | 75 | 100 | 18 | 1.33 |
| HOST 4 | DATA | ZONE 1 | 100 | 100 | 24 | 1 |
| HOST 5 | DATA | ZONE 2 | 125 | 100 | 31 | 0.8 |
| HOST 6 | DATA | ZONE 3 | 150 | 100 | 37 | 0.67 |
| HOST 7 | DATA | ZONE 1 | 200 | 100 | 49 | 0.57 |
| HOST 8 | DATA | ZONE 2 | 250 | 100 | 61 | 0.5 |
| HOST 9 | DATA | ZONE 3 | 225 | 100 | 55 | 0.44 |

| HOST NAME | HARDWARE CLASS | AVAILABILITY ZONE | CAPSULE COUNT | TOTAL GB | USED GB | OPPORTUNITY RATING |
|---|---|---|---|---|---|---|
| HOST 4 | DATA | ZONE 1 | 100 | 100 | 24 | 1 |
| HOST 5 | DATA | ZONE 2 | 125 | 100 | 31 | 0.8 |
| HOST 6 | DATA | ZONE 3 | 150 | 100 | 37 | 0.67 |
| HOST 7 | DATA | ZONE 1 | 200 | 100 | 49 | 0.57 |
| HOST 8 | DATA | ZONE 2 | 250 | 100 | 61 | 0.5 |
| HOST 9 | DATA | ZONE 3 | 300 | 100 | 73 | 0.44 |

FIG. 4D

| HOST NAME | HARDWARE CLASS | AVAILABILITY ZONE | CAPSULE COUNT | TOTAL GB | USED GB | OPPORTUNITY RATING |
|---|---|---|---|---|---|---|
| HOST 5 | DATA | ZONE 2 | 125 | 100 | 31 | 0.8 |
| HOST 6 | DATA | ZONE 3 | 150 | 100 | 37 | 0.67 |
| HOST 7 | DATA | ZONE 1 | 300 | 100 | 73 | 0.57 |
| HOST 8 | DATA | ZONE 2 | 250 | 100 | 61 | 0.5 |
| HOST 9 | DATA | ZONE 3 | 300 | 100 | 73 | 0.44 |

FIG. 4E

| HOST NAME | HARDWARE CLASS | AVAILABILITY ZONE | CAPSULE COUNT | TOTAL GB | USED GB | OPPORTUNITY RATING |
|---|---|---|---|---|---|---|
| HOST 1 | DATA | ZONE 1 | 25 | 100 | 6 | 4 |
| HOST 2 | DATA | ZONE 1 | 50 | 100 | 12 | 2 |
| HOST 3 | DATA | ZONE 1 | 400 | 100 | 70 | 1.33 |

FIG. 5A

| HOST NAME | HARDWARE CLASS | AVAILABILITY ZONE | CAPSULE COUNT | TOTAL GB | USED GB | OPPORTUNITY RATING |
|---|---|---|---|---|---|---|
| HOST 1 | DATA | ZONE 1 | 16 | 100 | 4 | 4 |
| HOST 2 | DATA | ZONE 1 | 50 | 100 | 12 | 2 |
| HOST 3 | DATA | ZONE 1 | 409 | 100 | 72 | 1.33 |

FIG. 5B

| HOST NAME | HARDWARE CLASS | AVAILABILITY ZONE | CAPSULE COUNT | TOTAL GB | USED GB | OPPORTUNITY RATING |
|---|---|---|---|---|---|---|
| HOST 2 | DATA | ZONE 1 | 66 | 100 | 16 | 2 |
| HOST 3 | DATA | ZONE 1 | 409 | 100 | 72 | 1.33 |

FIG. 5C

CAPSULE MIGRATION

BACKGROUND

The present invention relates generally to the capsule migration, and more particularly to capsule migration simulation.

Typically, a database refers to an organized collection of data stored and accessed electronically. Small databases can be stored on a file system, while large databases are hosted on computer clusters or cloud storage. The design of databases spans formal techniques and practical considerations, including data modeling, efficient data representation and storage, query languages, security and privacy of sensitive data, and distributed computing issues, including supporting concurrent access and fault tolerance.

A database management system (DBMS) is the software that interacts with end users, applications, and the database itself to capture and analyze the data. The DBMS software additionally encompasses the core facilities provided to administer the database. The sum total of the database, the DBMS and the associated applications can be referred to as a database system.

Compose is a private, Database-as-a-Service (DBaaS) platform for securely hosting and managing shared and dedicated source-available cross-platform document-oriented database instances. Compose offers relational databases as well as document-oriented databases Data migration refers to transferring data from one storage system or computing environment to another. Data migration can further include transferring certain processes from one computing environment to another. The traditional form of process migration is in computer clusters where processes are moved from machine to machine requiring serialization of the process image and migrating or reacquiring resources at the new machine.

SUMMARY

According to an aspect of the present invention, there is provided a computer-implemented method. The computer implemented method comprises: in response to receiving a request, analyzing one or more components of a network; predicting an optimal migration path for the one or more components of the network based, at least in part on an opportunity rating for each respective component of the network; and generating one or more recommendations based on the predicted optimal migration path of the one or more components.

BRIEF DESCRIPTION OF THE DRAWINGS

Preferred embodiments of the present invention will now be described, by way of example only, with reference to the following drawings, in which:

FIGS. 4A-E depict example tables depicting simulations for migration, in accordance with an embodiment of the present invention;

FIGS. 5A-C depict example outcomes for multiple candidate hosts during a simulation, in accordance with an embodiment of the present invention.

DETAILED DESCRIPTION

Embodiments of the present invention recognize that it is sometimes desirable to consolidate database instances in order to make more efficient user of server hardware. In most cases, consolidation of and/or migration of resources involve time-consuming manual calculations. As such, embodiments of the present invention provide solutions for a more efficient consolidation and migration of resources to target servers. For example, embodiments of the present invention can predicts which containers that objects (i.e., capsules containing state information) may migrate to before migration occurs. Embodiments of the present invention can then move the "state" (i.e., capsule) of a running computer across a network, including the state in its disks, memory, CPU registers, and I/O devices as well as its hardware state including the entire operating system as well as applications and running processes according to the predicted containers.

Current solutions offer consolidation processes that return unordered mapping of virtual machines to physical machines only after migration has completed. Embodiments of the present invention increase efficiency of migration by predicting the outcome (e.g., which containers objects will be migrated to) with granular substantiation (in the form of moves taken during simulation) before migration occurs. Stated another way, before any objects are actually moved, embodiments of the present invention can identify how many excess containers an environment has as determined by the simulation. Specifically, embodiments of the present invention can predict a migration outcome by generating one or more simulations that perform stepwise object migrations (i.e., recommended actions are explicitly ordered and meant to be followed sequentially as procedural steps to reach predicted outcomes) to reach most efficient use of resources, as discussed in greater detail later in this Specification.

Figure 1:
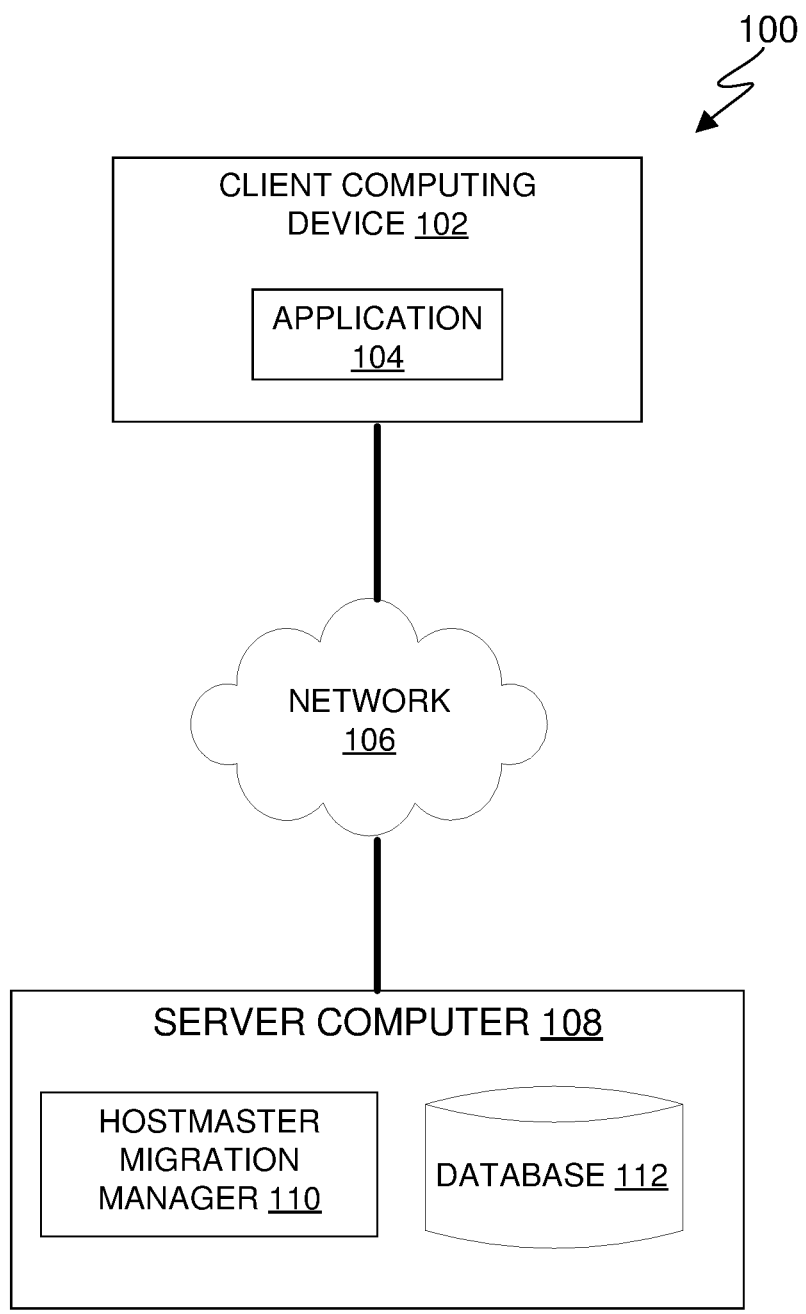
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 6.

In this embodiment, client computing device 102 is a user device associated with a user and includes application 104. Application 104 communicates with server computer 108 to access hostmaster migration manager 110 (e.g., using TCP/IP) to access user information and database information. Application 104 can further communicate with hostmaster migration manager 110 to predict migration outcomes of objects and containers by generating one or more simulations that perform stepwise object migrations, as discussed in greater detail in FIGS. 2-5.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts hostmaster migration manager 110 and database 112. In this embodiment, hostmaster migration manager 110 resides on server computer 108. In other embodiments, hostmaster migration manager 110 can have an instance of the program (not shown) stored locally on client computer device 102. In other embodiments, hostmaster migration manager 110 can be a standalone program or system that can be integrated in one or more computing devices having a display screen.

Hostmaster migration manager 110 predicts migration outcomes of objects and containers by generating one or more simulations that perform stepwise object migrations. In general, these one or more generated simulations allows hostmaster migration manager 110 to provide predicted outcome in the form of hosts removes and hosts remaining, prior to actual migrations taking place which can result in certain improvements and efficiencies to database management (e.g., prioritization of workload, distribution of work, etc.). In this embodiment, hostmaster migration manager 110 can identify one or more "clusters" having one or more "objects" living in "containers".

A "cluster," as used herein refers to a group of hosts divided into availability zones, which each zone being physically and virtually separated from others. For example, Cluster 1 can be divided into three different zones (e.g., Zone 1, Zone 2, and Zone 3). Zones help support high availability and if one zone becomes unavailable, other zones should remain unaffected. For example, Zone 1 can include Host 1 and Host 4, Zone 2 can include Host 2 and Host 5 while Zone 3 includes Host 3 and Host 6 represented by Table 1 reproduced below.

TABLE 1

Example Cluster
Cluster 1

| Zone 1 | Zone 2 | Zone 3 |
| --- | --- | --- |
| Host 1 | Host 2 | Host 3 |
| Host 4 | Host 5 | Host 6 |

In this embodiment, a container (i.e., host) refers to storage space for one or more objects. In this embodiment, hostmaster migration manager 110 can identify container size (e.g., percentage of RAM used on the container, the number of gigabytes of RAM used on the container, the total available RAM on the container, and graphical representation of those values. In this embodiment, there can be different types of hosts referred to as a hardware class. Each hardware class is configured to do a specific job. For example, hostmaster migration manager 110 can access an example hardware class (e.g., Table 2) describing the example Hosts 1-6.

TABLE 2

Example Hardware Class

| Host 1 | Proxy |
| --- | --- |
| Host 2 | Data |
| Host 3 | CPU |
| Host 4 | Config |
| Host 5 | Lightweight |
| Host 6 | Memory |

Each host (i.e., container) contains one or more capsules (i.e., objects). In this embodiment, an object (i.e., capsule) can reference any resource, its function, and what type of database is stored in a container. Each object (i.e., capsule) can be listed by the allocated name, deployment that capsule belongs to, the host name that can be used to refer to the capsule, the role of the capsule in the deployment, and the memory that the capsule is allocated (and may or may not be using). In this embodiment, capsule roles can include: member (i.e., runs an active database node), proxy (i.e., runs a portal for access), lightweight (i.e., runs a utility/administrative process), backup (i.e., runs a backup database node), and read-only (i.e., runs a synchronized read-only database node). For example, Host 1, belonging to the proxy hardware class, can contain capsules 1-4 (not shown).

In response to receiving a request, hostmaster migration manager 110 can generate a simulation that simulates the objectives and constraints of the request. In this embodiment, a request includes one or more tasks (i.e., objectives). For example, an objective can include directives to reduce costs and can further specify a method to reduce costs (e.g., consolidate and decommission hosts). An objective can also include a request to optimize a migration process by reducing an amount of resources and containers used. In certain instances, a request may specify constraints (i.e., additional requirements to consider in completing a task). Examples of constraints can include that a host should not contain more than 409 capsules, a host should not use more than 80% of its memory, and a host can migrate its capsules to another host in the same availability zone and hardware class.

Continuing the example, hostmaster migration manager 110 can predict an optimal migration path for an active cluster by generating a simulation that simulates the received objective and constraints of the request (e.g., consolidate and decommission hosts such that a host should not use more than 80% of its memory, and a host can migrate its capsules to another host in the same availability zone and hardware class). Hostmaster migration manager 110 generates the simulation by assessing active clusters and generating a visual representation of the cluster. In this embodiment the visual representation of the cluster includes one or more data points and resembles a gameboard, discussed later in this Specification. In other embodiments, the visual representation of the cluster can include any other suitable graphic.

In this embodiment, hostmaster migration manager 110 predicts an optimal migration path for an active cluster (and for the one or more components thereof) based, at least in part, on an opportunity rating for each respective component of the network. Each representation contains data points needed to quantify the host and make decisions about what moves to make. One of these data points is called an "opportunity rating". In this embodiment, hostmaster migration manager 110 calculates (i.e., generates) an opportunity rating using a current number of capsules and total memory. For example, if a first host has 1 gigabyte (GB) of memory and 2 capsules, hostmaster migration manager 110 calculates the opportunity rating for the host to be 0.5. If a second host has 1 GB memory and four capsules, hostmaster migration manager 110 calculates the opportunity for that host to be 0.25. In general, hostmaster uses the opportunity rating to find the fastest path to decommissioning hosts. Both of these example hosts are the same size, but the first host is less utilized than the second and will be faster and easier to decommission because there are only two capsules to move.

For example, given an object to container mapping table (e.g., Table 3)

TABLE 3

Object to Container Mapping

| Object | Container |
| --- | --- |
| Object 1 | Container 1 |
| Object 2 | Container 2 |
| Object 3 | Container 3 |
| Object 4 | Container 4 |
| Object 5 | Container 5 |
| Object 6 | Container 6 |
| Object 7 | Container 7 |
| Object 8 | Container 8 |

Hostmaster migration manager 110 can generate Table 4 which contains simulated object to container migrations.

TABLE 4

Simulation Results

| Object | Action | Container |
| --- | --- | --- |
| Object 8 | Move | Container 1 |
| Object 7 | Move | Container 1 |
| Object 6 | Move | Container 1 |

TABLE 4-continued

Simulation Results

| Object | Action | Container |
| --- | --- | --- |
| Object 5 | Move | Container 2 |
| Object 4 | Move | Container 2 |

Based on that simulation, hostmaster migration manager 110 can return an ordered set of "moves" (i.e., recommendations) that can be implemented either automatically or manually (e.g., through a user-based review). In this embodiment, hostmaster migration manager 110 can identify or otherwise generate a set of "moves" using the generated chess-like simulation that performs stepwise migrations to reach the most efficient usage. Continuing the examples leveraging Tables 1 and 2, Hostmaster migration manager 110 can then conclude that containers 8, 7, 6, 5, and 4 can be removed. In this embodiment, hostmaster migration manager 110 can either process the moves automatically, that is, empty, shut down, and otherwise remove these five unnecessary containers or may transmit its findings (e.g., Table 2 Simulation Results) to an end user (e.g., an engineer) to follow the instructions to remove those five unnecessary containers.

In this embodiment, hostmaster migration manager 110 can be implemented on Compose (e.g., Compose.io) and can access and identify Linux containers (e.g., LXC containers), not a full-fledged VM, living on physical machines, however, in other embodiments, hostmaster migration manager 110 can act on one or more other objects and containers.

Database 112 stores received information and can be representative of one or more databases that give permissioned access to hostmaster migration manager 110 or publicly available databases. For example, database 112 can store performance data, records, transactions, etc. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
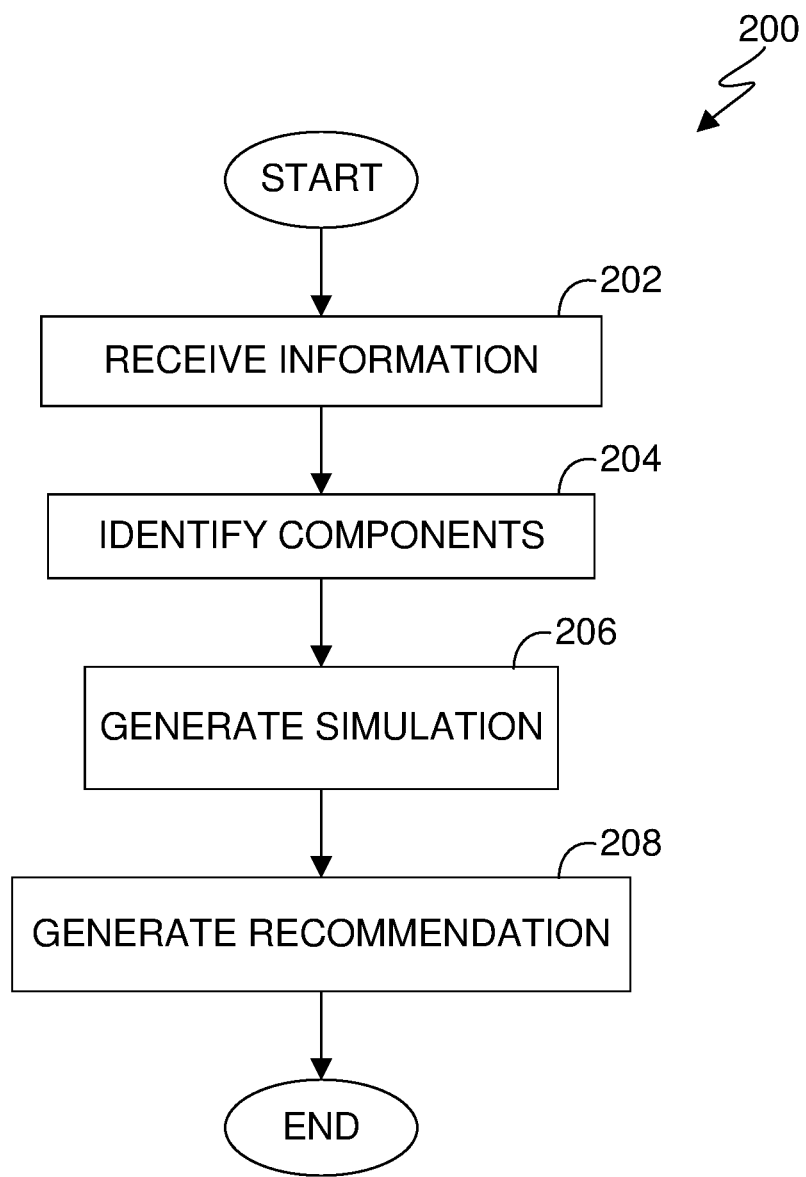
FIG. 2 is a flowchart depicting operational steps for generating a recommendation for migration based on a generated simulation, in accordance with an embodiment of the present invention.

FIG. 2 is a flowchart 200 depicting operational steps for generating a recommendation for migration based on a generated simulation, in accordance with an embodiment of the present invention.

In step 202, hostmaster migration manager 110 receives information. Information received can include a request to perform a task and other objectives and constraints associated with the task. For example, a task can be a request to optimize storage solutions. Objectives can specify certain methodologies to use in order to complete the task. For example, objectives for the optimization request can include consolidation and decommission of hosts connected to the network. In certain instances, the request may also specify constraints (i.e., rules) for the task. For example, constraints may specify that a host should not contain more than 409 capsules, a host should not use more than 80% of its memory, and a host can migrate its capsules to another host in the same availability zone and hardware class Information can also include information stored one or more databases (e.g., database 112) that store network data. As used herein, network data refers to state information of one or more clusters containing one or more hosts (i.e., containers) divided into availability zones. Network data can also include objects (i.e., capsules) of hosts. Network data can also include hardware capacity (e.g., total storage space), used storage space, and other performance metrics.

In step 204, hostmaster migration manager 110 identifies components from the received request. In this embodiment, hostmaster migration manager 110 identifies components connected to the network based on the received information. In this embodiment, hostmaster migration manager 110 identifies clusters (i.e., a group of hosts) connected to the network, hosts (i.e., containers) of associated with respective clusters, and respective objects (i.e., capsules) contained within their respective hosts as well as hardware and performance data (e.g., total storage space of a host, amount of storage used, amount of storage free, etc.). Hostmaster migration manager 110 can also identify availability zones of each respective cluster connected to the network using the received information. In certain embodiments, hostmaster migration manager 110 can access a "cluster view" to identify components associated with the received request. In other embodiments, hostmaster migration manager 110 can discover or otherwise identify clusters and hosts of respective clusters by transmitting a signal to otherwise identify clusters.

In step 206, hostmaster migration manager 110 generates a simulation based on the received request. In this embodiment, hostmaster migration manager 110 assesses the identified components. For example, for each identified cluster, hostmaster migration manager 110 can set representations of the identified hosts. In this embodiment, hostmaster migration manager 110 uses a game board as a representation for its hosts. In other embodiments, hostmaster migration manager 110 can use other visual representations to depict its hosts for a simulation (e.g., a table). In this embodiment, each representation contains datapoints that hostmaster migration manager 110 needs to quantify and evaluate a respective host. For example, in this embodiment, hostmaster migration manager 110 can calculate an opportunity rating for each host, and calculate migration paths (i.e., simulate migration paths) according to the opportunity rating as discussed in greater detail with respect to FIG. 3.

In step 208, hostmaster migration manager 110 generates a recommendation based on the results of the simulation. In this embodiment, hostmaster migration manager 110 generates a recommendation based on the results of the simulation by generating an ordered set of "moves" (i.e., recommendations) based on the results of the simulation. Hostmaster migration manager 110 can then implement these moves automatically (e.g., process these moves to empty, shut down, and otherwise remove containers) or send these recommendations to a user to be implemented manually by the user. In this embodiment, a recommendation can be expressed as a set of moves to satisfy a received request (i.e., task). Hostmaster migration manager 110 can alter its recommendation based on the objective and received constraints and can be configured to optimize for operations other than consolidate and decommission.

Figure 3:
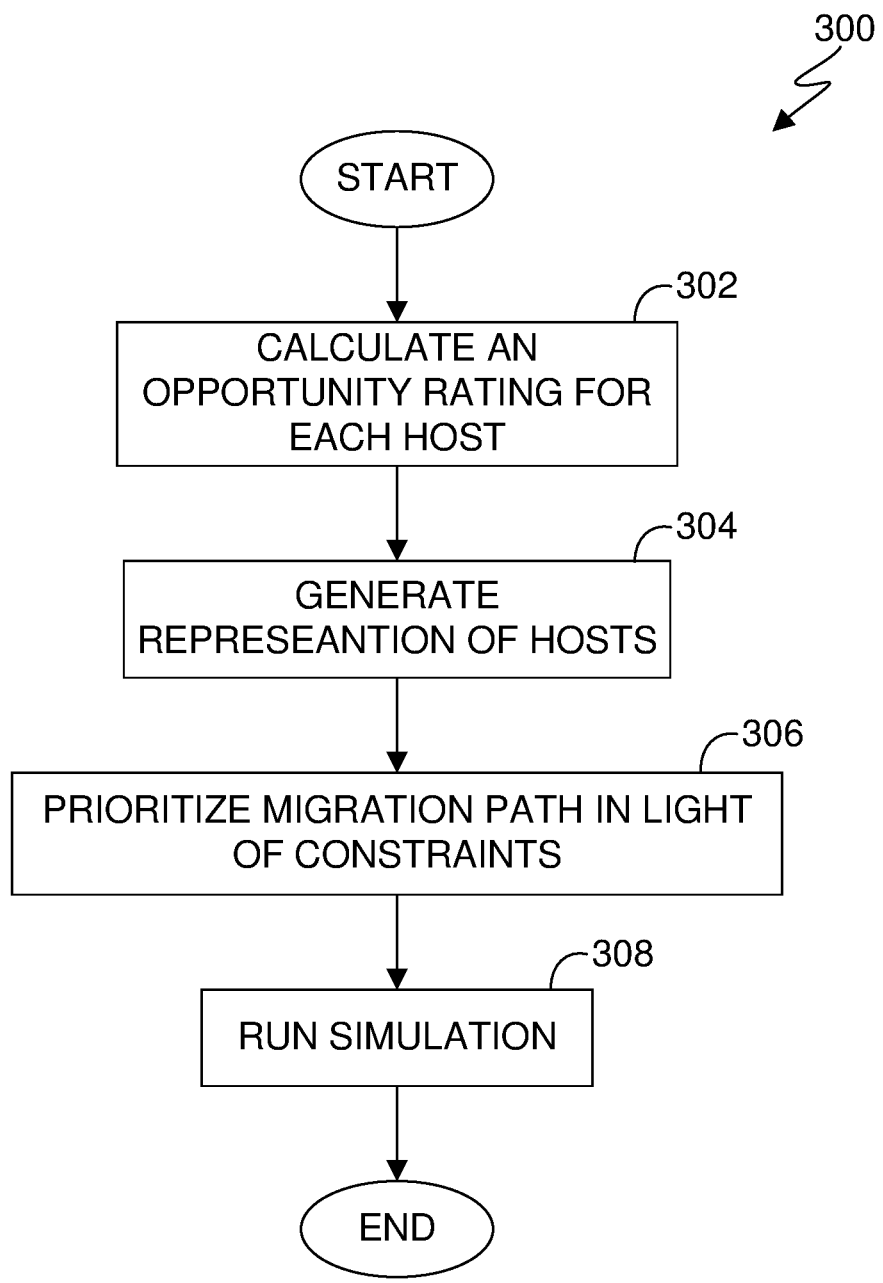
FIG. 3 is a flowchart depicting operational steps for generating a simulation for migration, in accordance with an embodiment of the present invention.

FIG. 3 is a flowchart 300 depicting operational steps for generating a simulation for migration, in accordance with an embodiment of the present invention.

In step 302, hostmaster migration manager 110 calculates an opportunity rating for each host. In this embodiment, hostmaster migration manager 110 calculates an opportunity rating for each host in an identified cluster using the current number of capsules (i.e., objects) and total memory. Specifically, hostmaster migration manager 110 divides total memory of the host by the number of capsules contained in the host to identify the opportunity cost. For example, if a host has 1 GB of memory and two capsules, hostmaster migration manager 110 calculates the opportunity rating for that host to be 0.5.

In step 304, hostmaster migration manager 110 generates a representation of hosts. In this embodiment, hostmaster migration manager 110 generates a representation of hosts using generated tables that mimic a gameboard. This table can include host names, hardware classes, availability zones, capsule counts, total GB, used GB, and opportunity ratings for each host in a cluster as described in greater detail with regard to FIGS. 4A-E, later in this Specification.

In step 306, hostmaster migration manager 110 prioritizes migration paths in light of constraints. In this embodiment, hostmaster migration manager 110 prioritizes migration paths according to the calculated opportunity rating. In this embodiment, hostmaster migration manager 110 prioritizes migration paths according to hosts with higher opportunity ratings. Specifically, a host with a higher opportunity rating indicates that that host is less utilized and therefore will be faster and easier to decommission. For example, hostmaster migration manager 110 can calculate an opportunity rating for a first host to be 0.5 with 1 GB of memory and 2 capsules. Hostmaster migration manager 110 can calculate an opportunity rating for a second host that has 1 GB and 4 capsules to be 0.25. Despite the first and the second host having the same size, hostmaster migration manager 110 identifies the first host having an opportunity rating of 0.5 to be less utilized than the second host (having an opportunity rating of 0.25). Hostmaster migration manager 110 can then conclude the first host will be faster and easier to decommission because there are only two capsules to move and subsequently begin migration of capsules contained in first host before migrating capsuled contained in the second host.

In this embodiment, hostmaster migration manager 110 uses a numeric scale where lesser numbers indicate a lower opportunity rating. Conversely, greater numbers indicate a higher opportunity rating (e.g., in a numeric scale from 0-10, a rating of 10 indicates a higher opportunity rating than a rating of 2).

In instances where hostmaster migration manager 110 receives additional constraints associated with the received request, hostmaster migration manager can alter its migration plan to satisfy the additional constraints in light of the calculated opportunity rating.

In step 308, hostmaster migration manager 110 runs the generated simulation. In this embodiment, hostmaster migration manager 110 runs the generated simulation according to the migration plan. At the conclusion of the simulation, hostmaster migration manager 110 can then generate a report of actions (i.e., moves) taken during the simulation and generate a list of recommendations based on the actions taken during the simulation as discussed in FIG. 2.

FIGS. 4A-E depict example tables depicting simulations for migration, in accordance with an embodiment of the present invention.

FIG. 4A depicts a generated graphical representation of a gameboard, in accordance with an embodiment of the present invention.

Specifically, FIG. 4A depicts gameboard 400, expressed as a table after hostmaster migration manager 110 calculated opportunity ratings for each of the identified hosts (e.g., hosts 1-9) in a cluster. Gameboard 400 includes 7 columns for respective data points for host name, hardware class, availability zones, capsule counts, total memory (e.g., gigabytes) for each host, used memory (e.g., gigabytes) for respective hosts, and opportunity ratings for each host in the cluster. In this example, each of the hosts (e.g., hosts 1-9) all belong to the "data" hardware class and has a capacity of 100 gigabytes (GB). Zone 1 includes hosts 1, 4, and 7. Zone 2 includes hosts 2, 5, and 8 while Zone 3 includes hosts 3, 6, and 9, respectively.

As shown by gameboard 400, host 1 has a capsule count of 25. Host 2 has a capsule count of 50. Host 3 has a capsule count of 75. Host 4 has a capsule count of 100. Host 5 has a capsule count of 125. Host 6 has a capsule count of 150. Host 7 has a capsule count of 175. Host 8 has a capsule count of 200. Host 9 has a capsule count of 225.

Host 1 has used 6 GB. Host 2 has used 12 GB. Host 3 has used 18 GB. Host 4 ha used 24 GB. Host 5 has used 31 GB. Host 6 has used 37 GB. Host 7 has used 43 GB. Host 8 has used 49 GB. Host 9 has used 55 GB.

In this example, hostmaster migration manager 110 has calculated the opportuniting rations for each of the identified hosts, hosts 1-9, to be 4.00, 2.00, 1.33, 1.00, 0.80, 0.67, 0.57, 0.50, and 0.44 respectively.

FIG. 4B depicts a simulation of a move taken in a generated graphical representation of a gameboard, in accordance with an embodiment of the present invention.

Specifically, FIG. 4B depicts gameboard 402, expressed as a table after hostmaster migration manager 110 has begun the simulation. In this example, hostmaster migration manager 110 begins migration moving capsules from the host with the highest opportunity rating to an eligible host with the lowest opportunity rating, recording each move in the simulation. In this example, hostmaster migration manager 110 identifies host 1 as having the highest opportunity rating (4.0) and therefore empties host 1 by migrating 25 capsules (6 GB) to Host 7 brining host 7's capsule count to 200 and used GB to 49.

FIG. 4C depicts a simulation of a move taken in a generated graphical representation of a gameboard, in accordance with an embodiment of the present invention.

Specifically, FIG. 4C depicts gameboard 406, expressed as a table after hostmaster migration manager 110 has taken a second move. In this example, hostmaster migration manager 110 identifies host 2 as having the highest opportunity rating (2.0). Accordingly, hostmaster migration manager 110 empties host 2 by migrating 50 capsules (12 GB) to Host 8, brining host 8's capsule count to 250 and used GB to 61.

FIG. 4D depicts a simulation of a move taken in a generated graphical representation of a gameboard, in accordance with an embodiment of the present invention.

Specifically, FIG. 4D depicts gameboard 408, expressed as a table after hostmaster migration manager 110 has taken a third move. In this example, hostmaster migration manager 110 identifies host 3 as having the highest opportunity rating (1.33). Accordingly, hostmaster migration manager 110 empties host 3 by migrating 75 capsules (18 GB) to Host 9, brining host 9's capsule count to 300 and used GB to 73.

FIG. 4E depicts a simulation of a move taken in a generated graphical representation of a gameboard, in accordance with an embodiment of the present invention.

Specifically, FIG. 4E depicts gameboard 410, expressed as a table after hostmaster migration manager 110 has taken a fourth move. In this example, hostmaster migration manager 110 identifies host 4 as having the highest opportunity rating (1.00). Accordingly, hostmaster migration manager 110 empties host 4 by migrating 100 capsules (24 GB) to Host 7, brining host 7's capsule count to 300 and used GB to 73.

In this example, the simulation ends and hostmaster migration manager 110 generates a report noting that it skipped hosts 5-9 because no candidate hosts exists and that its simulation finished with 4 empty hosts.

FIGS. 5A, 5B, and 5C depict example outcomes for multiple candidate hosts during a simulation, in accordance with an embodiment of the present invention.

FIG. 5A depicts an example table (e.g., gameboard) 502 where there are multiple candidate hosts, in accordance with an embodiment of the present invention.

In this example, there are three hosts, hosts 1, 2, and 3 each classified as "data" hardware classes, each host having a 100 GB capacity. Host 1 contains 25 capsules, host 2 contains 50 capsules, and host 3 contains 400 capsules. Accordingly, hostmaster migration manager 110 has calculated opportunity ratings for each of the hosts to be 4, 2, and 1.33 respectively. In this example, hostmaster migration manager 110 has received the following constraints: a) a host should not contain more than 409 capsules, b) a host should not use more than 80% of its memory, and c) a host can only migrate its capsules to another host in the same availability zone and hardware class.

In this example, either Host 2 or Host 3 can be considered candidate hosts to receive migration of capsules. In these instances, hostmaster migration manager 110 can split resources between candidate hosts according to constraints, as necessary.

FIG. 5B depicts an example table (e.g., gameboard) 502 after selecting a candidate host for simulation, in accordance with an embodiment of the present invention.

In this example, hostmaster migration manager 110 identifies host 1 as having the highest opportunity rating (4.00). Hostmaster migration manager 110 identifies constraint "a" and prioritizes migration according to the highest opportunity rating and constraint a (e.g., a host should not contain more than 409 capsules). Accordingly, hostmaster migration manager 110 empties host 1 by migrating 9 capsules (2 GB) to Host 3, brining host 3's capsule count to 409 and used GB to 72 leaving host 1 with 16 capsules and 4 GB used.

FIG. 5C depicts an example table (e.g., gameboard) 502 after selecting another candidate host for simulation, in accordance with an embodiment of the present invention.

In this example, hostmaster migration manager 110 still identifies host 1 as having the highest opportunity rating (4.00). Hostmaster migration manager 110 identifies constraint "a" and prioritizes migration according to the highest opportunity rating and constraint a (e.g., a host should not contain more than 409 capsules). Accordingly, hostmaster migration manager 110 empties host 1 by migrating the remaining 16 capsules (4 GB) to Host 2, brining host 2's capsule count to 66 and used GB to 16.

In this example, hostmaster migration manager 110 has skipped host 2 because no candidate hosts remain and finished the simulation with an empty host (e.g., host 1). Hostmaster migration manager 110 can then generate a report comprising a list of the moves it took to determine which hosts to remove, lists of hosts removed, order in which to remove those hosts.

In this manner, when functioning in Compose, hostmaster migration manager 110 can survey the entire Compose estate, determine which of its hosts are superfluous and the order in which they should shut down—host by host in the order specified. Using representations of containers and objects, hostmaster migration manager 110 granularly "games out" an accurate prediction of what will happen. This information is useful to engineers by providing direction and taking the guess work out host consolidation. The generated report hostmaster migration manger 110 can provide can be useful to management for forecasting, budgeting and reporting purposes.

Figure 6:
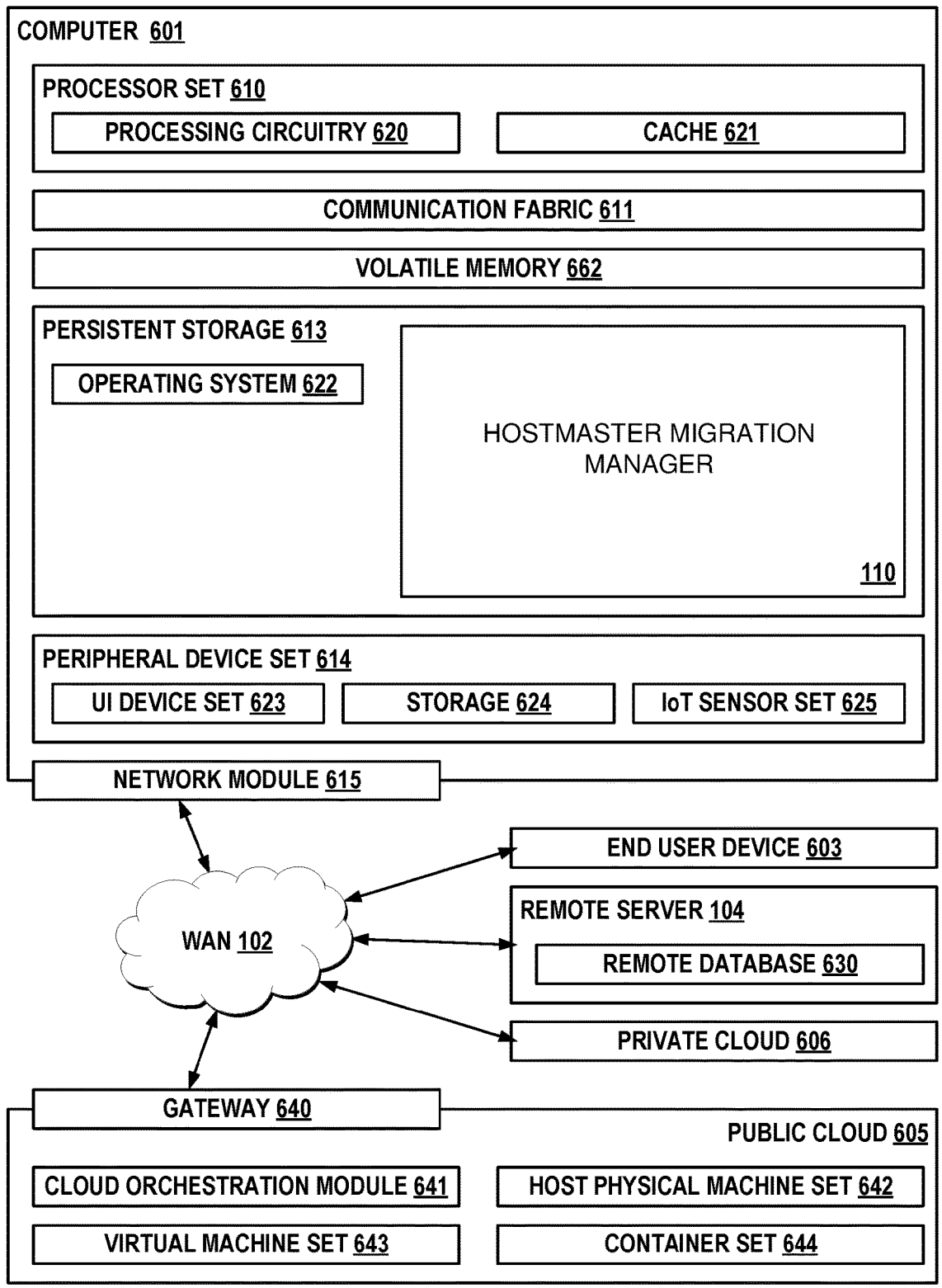
FIG. 6 is a block diagram of an alternate computing environment, in accordance with an embodiment of the present invention.

FIG. 6 depicts an alternate block diagram of components of computing systems within computing environment 100 of FIG. 1, in accordance with an embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as hostmaster migration manager 110 (also referred to as block 110) dynamically aggregates records for long transactions by generating a mechanism (e.g., an execution slot) to exclude identified performance data of long transactions from current aggregation, store the excluded performance data in memory, and subsequently retrieve the performance data as discussed previously with respect to FIGS. 2-5.

In addition to block 110, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 110, as identified above), peripheral device set 614 (including user interface (UI), device set 123, storage 124, and Internet of Things (IOT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 101, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 120 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 110 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 110 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

What is claimed is:

1. A computer-implemented method comprising:
   in response to receiving a request, analyzing one or more components of a network;
   predicting an optimal migration path for the one or more components of the network using an opportunity rating for each respective component of the network that is based on a total memory associated with a respective component and a current number of objects stored on the respective component; and
   generating one or more recommendations based on the predicted optimal migration path of the one or more components.

2. The computer-implemented method of claim 1, wherein the one or more components of a network comprise: one or more clusters comprising a group of hosts for each respective cluster, wherein the group of hosts for each respective cluster are divided into availability zones with each availability zone being physically and virtually separated from other availability zones.

3. The computer-implemented method of claim 1, wherein predicting an optimal migration path for the one or more components of the network based, at least in part on an opportunity rating for each respective component of the network comprises:
   identifying a cluster and one or more hosts contained in the cluster;
   identifying respective zones that each host contained in the cluster; and
   generating an opportunity rating for each host contained in the cluster based on a current number of objects stored on a respective host and total memory associated with the respective host.

4. The computer-implemented method of claim 3, wherein generating an opportunity rating for each host contained in the cluster based on a current number of objects stored on a respective host and total memory associated with the respective host comprises:
   identifying total memory capacity of the respective host and number of objects contained in the respective host; and
   dividing the total memory capacity of the respective host by the number of objects contained in the respective host.

5. The computer-implemented method of claim 3, further comprising:
   generating a visual representation of the cluster comprising one or more hosts comprising one or more objects of respective hosts that are contained in the cluster; and
   simulating migration of the one or more objects of a host of the one or more hosts to another host of the one or more hosts using the generated visual representation of the cluster and the generated opportunity rating for each host of the one or more hosts.

6. The computer-implemented method of claim 5, wherein simulating migration of the one or more components of the network using the generated visual representation of the cluster and the calculated opportunity rating for each host of the one or more hosts comprises:
   prioritizing migration of objects of the one or more hosts in order of the host having a highest calculated opportunity rating to the host having a lowest calculated opportunity rating; and
   moving one or more objects of the host having the highest calculated opportunity rating to the host having the lowest calculated opportunity rating.

7. The computer-implemented method of claim 6, wherein a higher calculated opportunity rating represents less utilization of the respective host that a lower calculated opportunity rating.

8. A computer program product comprising:
   one or more computer readable storage media and program instructions stored on the one or more computer readable storage media, the program instructions comprising:
   program instructions to, in response to receiving a request, analyzing one or more components of a network;
   program instructions to predict an optimal migration path for the one or more components of the network using an opportunity rating for each respective component of the network that is based on a total memory associated with a respective component and a current number of objects stored on the respective component; and program instructions to generate one or more recommendations based on the predicted optimal migration path of the one or more components.

9. The computer program product of claim 8, wherein the one or more components of a network comprise: one or more clusters comprising a group of hosts for each respective cluster, wherein the group of hosts for each respective cluster are divided into availability zones with each availability zone being physically and virtually separated from other availability zones.

10. The computer program product of claim 8, wherein the program instructions to predict an optimal migration path for the one or more components of the network based, at least in part on an opportunity rating for each respective component of the network comprise:
   program instructions to identify a cluster and one or more hosts contained in the cluster;
   program instructions to identify respective zones that each host contained in the cluster; and
   program instructions to generate an opportunity rating for each host contained in the cluster based on a current number of objects stored on a respective host and total memory associated with the respective host.

11. The computer program product of claim 10, wherein the program instructions to generate an opportunity rating for each host contained in the cluster based on a current number of objects stored on a respective host and total memory associated with the respective host comprise:
   program instructions to identify total memory capacity of the respective host and number of objects contained in the host; and
   program instructions to divide the total memory capacity of the respective host by the number of objects contained in the host.

12. The computer program product of claim 10, wherein the program instructions stored on the one or more computer readable storage media further comprise:
   program instructions to generate a visual representation of the cluster comprising one or more hosts comprising one or more objects of respective hosts that are contained in the cluster; and
   program instructions to simulate migration of the one or more objects of a host of the one or more hosts to another host of the one or more hosts using the generated visual representation of the cluster and the generated opportunity rating for each host of the one or more hosts.

13. The computer program product of claim 12, wherein the program instructions to simulate migration of the one or more components of the network using the generated visual representation of the cluster and the calculated opportunity rating for each host of the one or more hosts comprise:
   program instructions to prioritize migration of objects of the one or more hosts in order of the host having a highest calculated opportunity rating to the host having a lowest calculated opportunity rating; and
   program instructions to move one or more objects of the host having the highest calculated opportunity rating to the host having the lowest calculated opportunity rating.

14. The computer program product of claim 13, wherein a higher calculated opportunity rating represents less utilization of the respective host that a lower calculated opportunity rating.

15. A computer system comprising:
   one or more computer processors;
   one or more computer readable storage media; and
   program instructions stored on the one or more computer readable storage media for execution by at least one of the one or more computer processors, the program instructions comprising:
   program instructions to, in response to receiving a request, analyzing one or more components of a network;
   program instructions to predict an optimal migration path for the one or more components of the network using an opportunity rating for each respective component of the network that is based on a total memory associated with a respective component and a current number of objects stored on the respective component; and
   program instructions to generate one or more recommendations based on the predicted optimal migration path of the one or more components.

16. The computer system of claim 15, wherein the one or more components of a network comprise: one or more clusters comprising a group of hosts for each respective cluster, wherein the group of hosts for each respective cluster are divided into availability zones with each availability zone being physically and virtually separated from other availability zones.

17. The computer system of claim 15, wherein the program instructions to predict an optimal migration path for the one or more components of the network based, at least in part on an opportunity rating for each respective component of the network comprise:
   program instructions to identify a cluster and one or more hosts contained in the cluster;
   program instructions to identify respective zones that each host contained in the cluster; and
   program instructions to generate an opportunity rating for each host contained in the cluster based on a current number of objects stored on a respective host and total memory associated with the respective host.

18. The computer system of claim 17, wherein the program instructions to generate an opportunity rating for each host contained in the cluster based on a current number of objects stored on a respective host and total memory associated with the respective host comprise:
   program instructions to identify total memory capacity of the respective host and number of objects contained in the respective host; and
   program instructions to divide the total memory capacity of the respective host by the number of objects contained in the respective host.

19. The computer system of claim 17, wherein the program instructions stored on the one or more computer readable storage media further comprise:
   program instructions to generate a visual representation of the cluster comprising one or more hosts comprising one or more objects of respective hosts that are contained in the cluster; and
   program instructions to simulate migration of the one or more objects of a host of the one or more hosts to another host of the one or more hosts using the generated visual representation of the cluster and the generated opportunity rating for each host of the one or more hosts.

20. The computer system of claim 19, wherein the program instructions to simulate migration of the one or more components of the network using the generated visual representation of the cluster and the calculated opportunity rating for each host of the one or more hosts comprise:

program instructions to prioritize migration of objects of the one or more hosts in order of the host having a highest calculated opportunity rating to the host having a lowest calculated opportunity rating; and
program instructions to move one or more objects of the host having the highest calculated opportunity rating to the host having the lowest calculated opportunity rating.

* * * * *